United States Patent
Xu et al.

(10) Patent No.: US 10,319,140 B2
(45) Date of Patent: Jun. 11, 2019

(54) TRI-CUBIC AND HYBRID INTERPOLATION IN A 3D TEXTURE SHADER

(71) Applicant: Landmark Graphics Corporation, Houston, TX (US)

(72) Inventors: Zitao Xu, Katy, TX (US); Genbao Shi, Sugar Land, TX (US); Andres Cesar Callegari, Cypress, TX (US); ChiKang David Chien, Sugar Land, TX (US); Jeffrey Marc Yarus, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 15/108,704

(22) PCT Filed: Jul. 7, 2015

(86) PCT No.: PCT/US2015/039301
§ 371 (c)(1),
(2) Date: Jun. 28, 2016

(87) PCT Pub. No.: WO2017/007451
PCT Pub. Date: Jan. 12, 2017

(65) Prior Publication Data
US 2017/0148209 A1    May 25, 2017

(51) Int. Cl.
*G06T 15/80* (2011.01)
*G06T 15/00* (2011.01)
*G06T 15/04* (2011.01)

(52) U.S. Cl.
CPC ............ *G06T 15/80* (2013.01); *G06T 15/005* (2013.01); *G06T 15/04* (2013.01)

(58) Field of Classification Search
None
See application file for complete search history.

(56) References Cited

U.S. PATENT DOCUMENTS

| 6,246,414 B1 | 6/2001 | Kawasaki |
| 2002/0005856 A1* | 1/2002 | Sasaki ............... G06T 17/30 345/606 |

(Continued)

FOREIGN PATENT DOCUMENTS

EP    0762265 A2    3/1997

OTHER PUBLICATIONS

International Searching Authority, International Search Report and Written Opinion, International application No. PCT/US2015/039301, which is a PCT parent to the instant application, dated May 19, 2016.

(Continued)

*Primary Examiner* — Edward Martello
(74) *Attorney, Agent, or Firm* — Howard L. Speight, PLLC (57) ABSTRACT

A consecutive set of data points, P1, P2, P3, and P4, is selected. A first line is created through P1 and P3. A first tangent vector originating at P2, parallel to the first line, is created. A second line through P2 and P4 is created. A second tangent vector through P3 is created. The second tangent vector is parallel to the second line. A baseline through P2 and P3 is created. A Bezier curve between P2 and P3 is created, wherein the Bezier curve has a degree. The degree of the Bezier curve is determined based on a comparison of the first tangent vector, the second tangent vector, and the baseline.

18 Claims, 10 Drawing Sheets

(56) References Cited

U.S. PATENT DOCUMENTS

| | | | |
|---|---|---|---|
| 2005/0018885 A1* | 1/2005 | Chen | G06T 17/00 |
| | | | 382/128 |
| 2005/0246130 A1* | 11/2005 | Spicer | G06T 17/30 |
| | | | 702/152 |
| 2009/0033658 A1 | 2/2009 | Rockwood et al. | |
| 2013/0063433 A1 | 3/2013 | Lin | |

OTHER PUBLICATIONS

Institut National De La Propriete Industrielle, Direction De La Propriete Industrielle, Notification Avan Decision De Reject, Demande De brevet d'invention No. 16 55779, entire document, which is an FR counterpart to the instant application, Oct. 5, 2016.

Canadian Intellectual Property Office, Innovation, Science and Economic Development Canada, Examiner's Letter, Oct. 2, 2018, Canada.

Demofox, Cubic Hermite Interpolation, The blog at the bottom of the sea, Programming, Graphics, Gamedev, Exotic Computation, Audio Synthesis, pp. 1-7, Aug. 8, 2015, URL:https://blog.demofox.org/2015/08/08/cubic-hermite-interpolation/.

English (Machine) Translation of Instieut National De La Propriete Industrielle, Opinion Ecrite Sur La Brevetabilite De L'Invention and Rapport De Recherche Preliminaire, Preliminary French Search Report and Written Opinion, dated Feb. 18, 2019, Republique Francaise.

English (Machine) Translation of Thomas Guillod, Travail de Maturite realise au Lycee Blaise-Cendrars sous la direction de Jean-Bernard Mathey, Interpolations, courbes de Bezier et B-Splines, Bulletin de la Societe des Enseignants Neuchatelois de Sciences) 34), pp. 1-50, Janvier 2008.

Instieut National De La Propriete Industrielle, Opinion Ecrite Sur La Brevetabilite De L'Invention and Rapport De Recherche Preliminaire, Preliminary French Search Report and Written Opinion, dated Feb. 18, 2019, French Application No. FR 1655779, which is the FR counterpart to the instant application, Republique Francaise.

Jim Ching-Rong Lin and Zitao Xu, Halliburton/Landmark Software and Services, High-Quality Seismic Bicubic Interpolation in a 3-D Visualization Environment, SEG San Antonio 2011 Annual Meeting, pp. 1170-1174, 2011 SEG.

Robert Schaback, On Global GC2 Convexity Preserving Interpolation of Planar Curves by Piecewise Bezier Polynomials, Institut for Numerische und Angewandte Mathematik Universitiit Gottingen, D-3400 Gottingen, FRG pp. 1-10, 1989.

Thomas Guillod, Travail de Maturite realise au Lycee Blaise-Cendrars sous la direction de Jean-Bernard Mathey, Interpolations, courbes de Bezier et B-Splines, Bulletin de la Societe des Enseignants Neuchatelois de Sciences) 34), pp. 1-50, Janvier 2008.

\* cited by examiner

TRI-CUBIC AND HYBRID INTERPOLATION IN A 3D TEXTURE SHADER

BACKGROUND

As computers render three-dimensional (3D) volumetric seismic data, they often only use tri-linear or tri-cubic interpolation methods to render the data. Tri-linear is fast but may not produce smooth-looking results. Tri-cubic produces smooth results, but generates large computational loads even when using a powerful computer. It is challenging to perform 3D texture rendering that is both smooth and fast.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
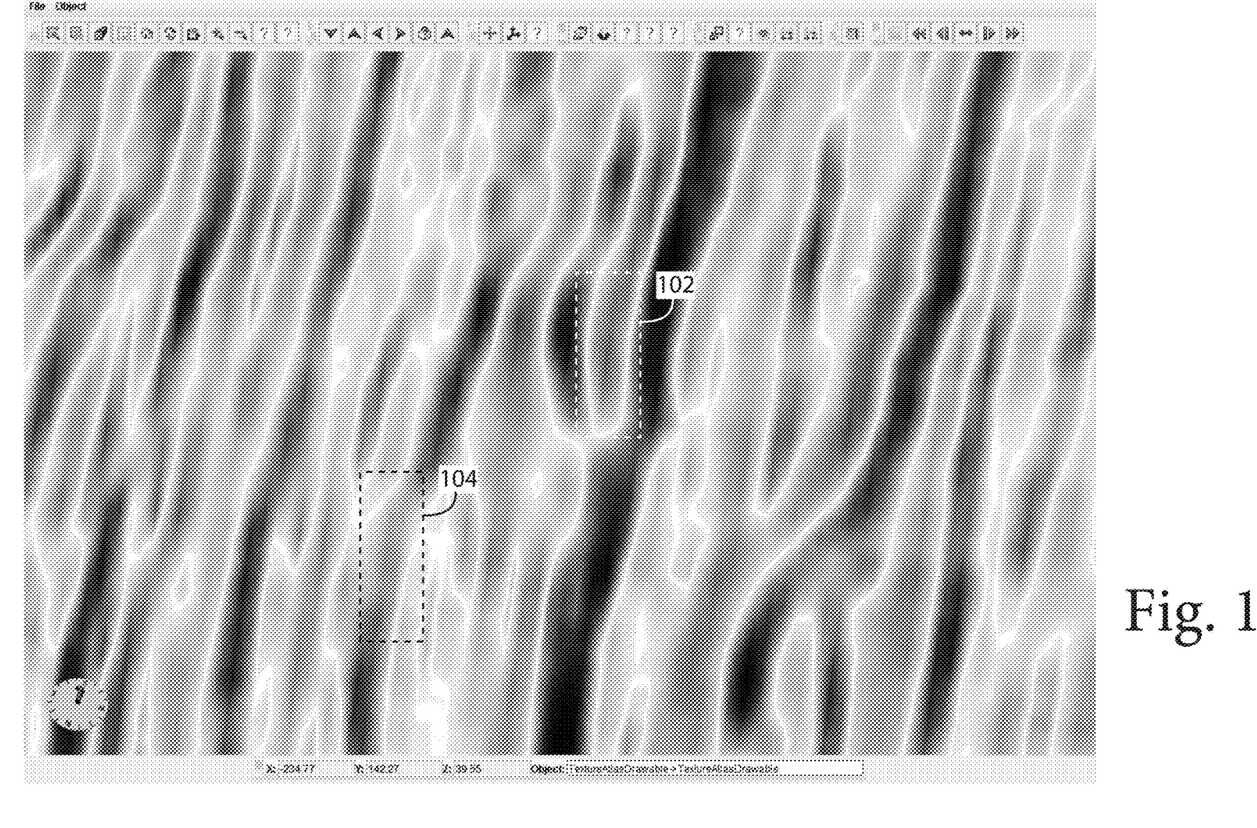
FIG. 1 is a view of a tri-linear rendering showing processing artifacts.

A conventional three-dimensional (3D) texture shader renders raw volumetric data into a two-dimensional (2D) or 3D image using interpolation, in which pixel or voxel values are derived from neighboring data values. As illustrated in FIG. 1, images rendered using tri-linear interpolation include artifacts, such as vertical stripe patterns, e.g., the vertical stripe patterns in areas 102 and 104, that are not accurate representations of the data. A user who relies on such an artifact in the image may interpret the data incorrectly. For example, one of the lines may be misinterpreted as a void or as a feature, and relying on that misinterpretation may have costly consequences. For example, in the oil field, incorrectly analyzing raw seismic data may result in incorrect placement of an oil well. In the medical field, incorrectly analyzing magnetic resonance imaging (MM) data may result in a misdiagnosis.

Figure 2:
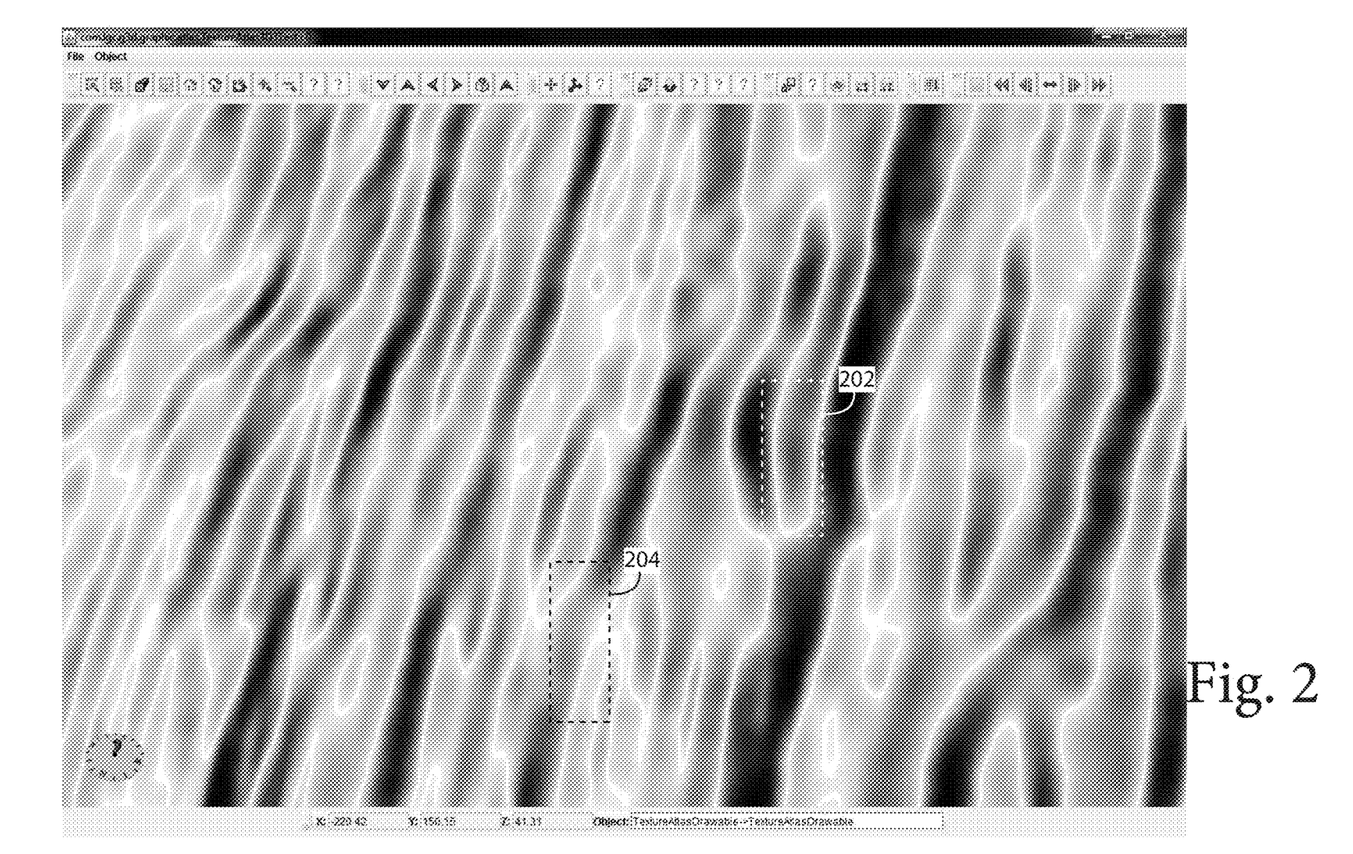
FIG. 2 is a view of a tri-cubic rendering showing the elimination of the processing artifacts.

FIG. 2 shows the data from FIG. 1 analyzed using a tri-cubic interpolation, which reduces the number of artifacts. As can be seen by comparing areas 202 and 204 in FIG. 2 to respective areas 102 and 104 in FIG. 1, the vertical stripe patterns have been reduced and the intensity fades smoothly in all directions.

Figure 3:
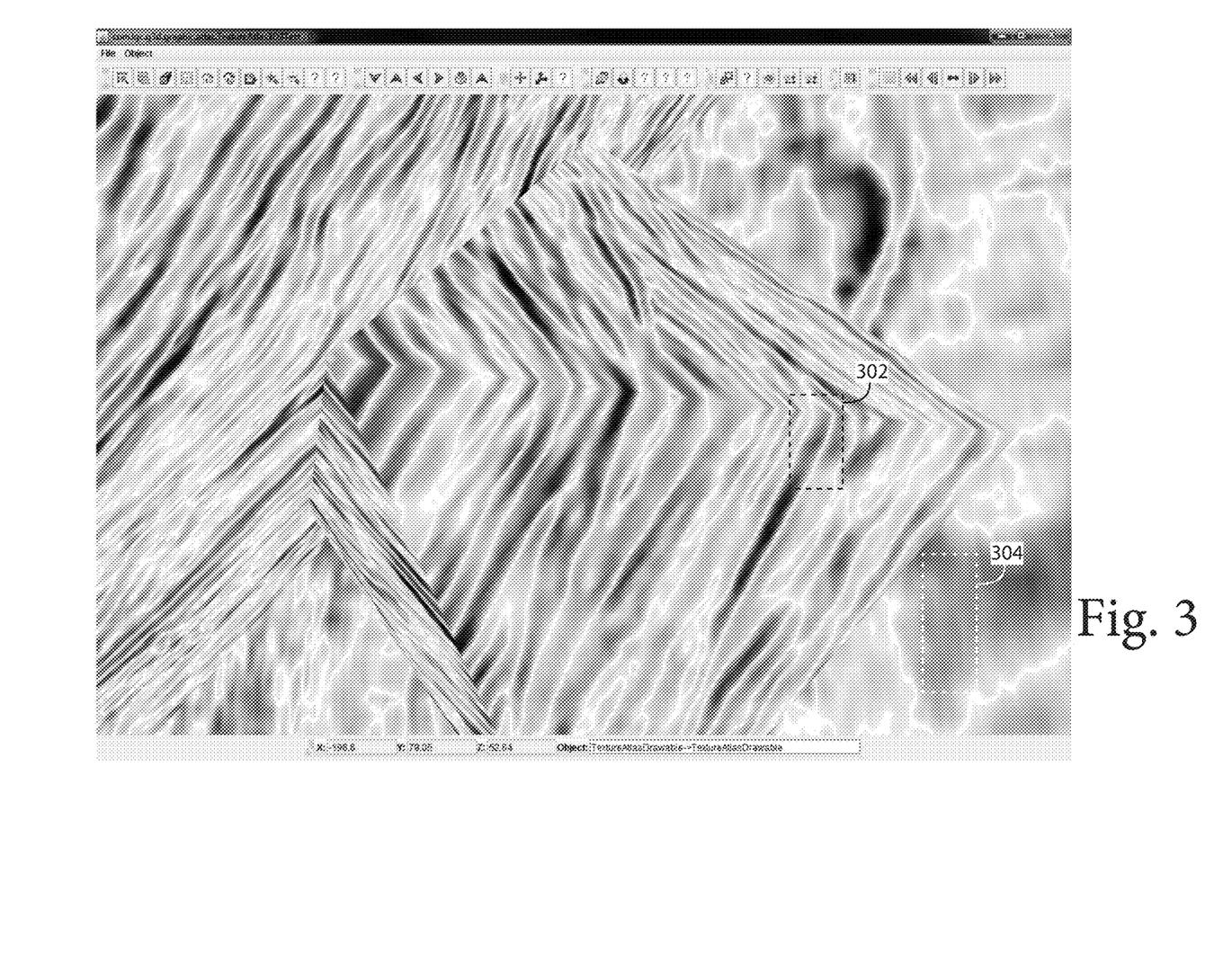
FIG. 3 is a view of a tri-linear rendering showing processing artifacts.

FIG. 3 shows a tri-linear interpolation, which includes artifacts, i.e., stripe patterns in the texture direction, such as the stripe patterns in areas 302 and 304.

Figure 4:
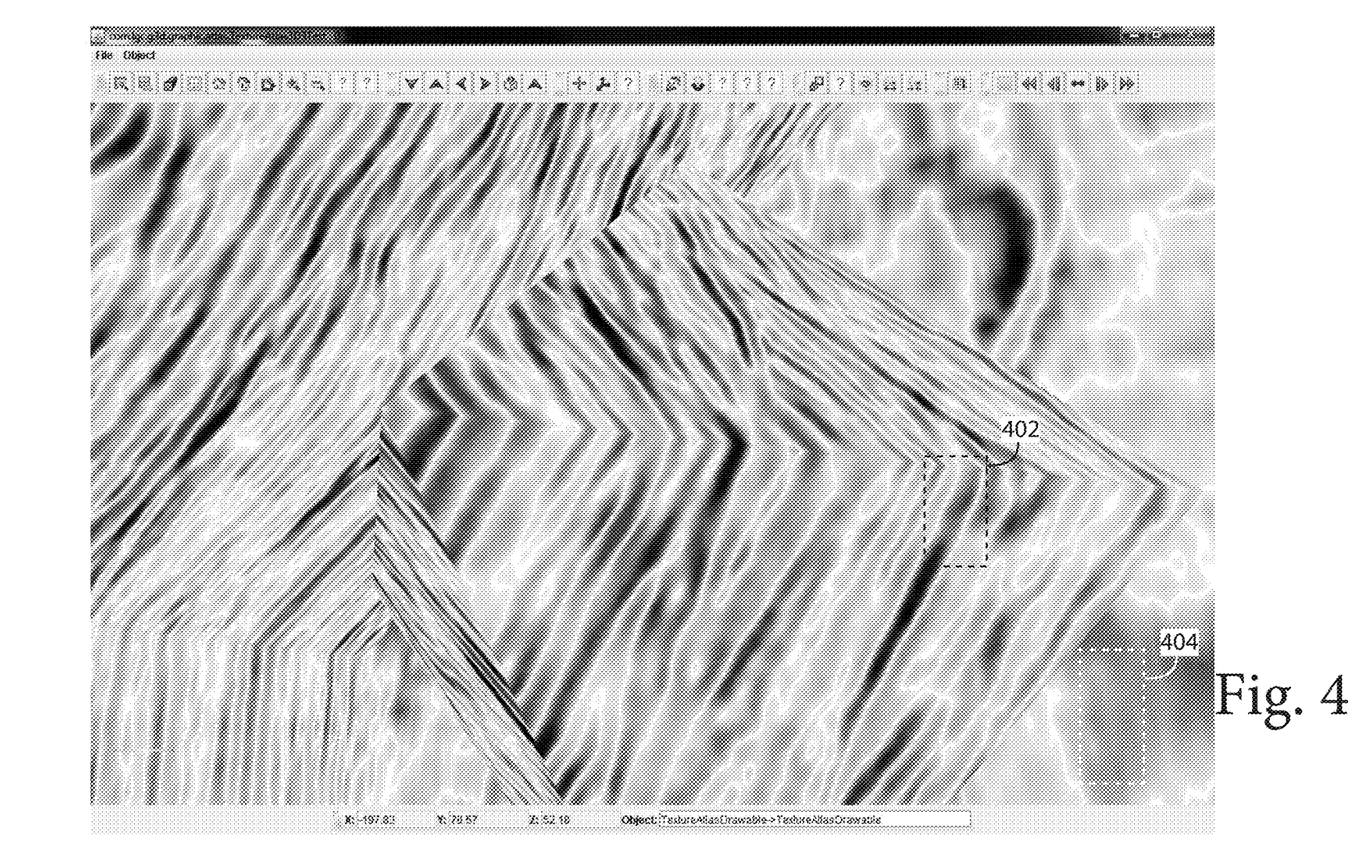
FIG. 4 is a view of a tri-cubic rendering showing the elimination of the processing artifacts.

FIG. 4 shows the data from FIG. 3 analyzed using a tri-cubic interpolation, which reduces the number of artifacts. As can be seen by comparing areas 402 and 404 in FIG. 4 to respective areas 302 and 304 in FIG. 3, the vertical stripe patterns have been reduced and the intensity fades smoothly in all directions.

A hybrid shader (which is part of the 3D texture shader) uses cubic, quadratic, or linear interpolation, as discussed below, on each of three physical dimensions (x, y, and z). The hybrid shader may also use a fourth dimension (time-axis). Any four consecutive vertices uniquely generate a curve segment, and each pair of curve segments is smoothly connected.

For example, if A0, A1, A2, A3, and A4 are five consecutive vertices (which have associated scalar values of a0, a1, a2, a3, and a4, respectively), then the A0, A1, A2, and A3 vertices build the first curve segment, and the A1, A2, A3, A4 vertices build the second curve segment.

The formula to build the first curve segment $F1(t)$, $t=[0,1]$ is:

$$A=(a0+a2-2*a1)/2;$$

$$B=(a2-a0)/2;$$

$$D=(a1+a3-2*a2)/2;$$

$$E=(4*a2-3*a1-a3)/2;$$

$$t\_1=(1-t);$$

$$tt2=t*t;$$

$$ampl1=A*tt2+B*t+a1;$$

$$ampl2=D*tt2+E*t+a1;$$

$$F1(t)=(ampl1*t\_1+ampl2*t); \qquad (1)$$

Replacing (a0, a1, a2, a3) with (a1, a2, a3, a4) in the above formula will produce:

$$F2(t), t=[0,1] \quad (2)$$

F2 is the second curve segment, which is smoothly connected to the first curve segment, as shown by verifying:

$$F1'(1)=F2'(0) \quad (3)$$

Figure 5A:
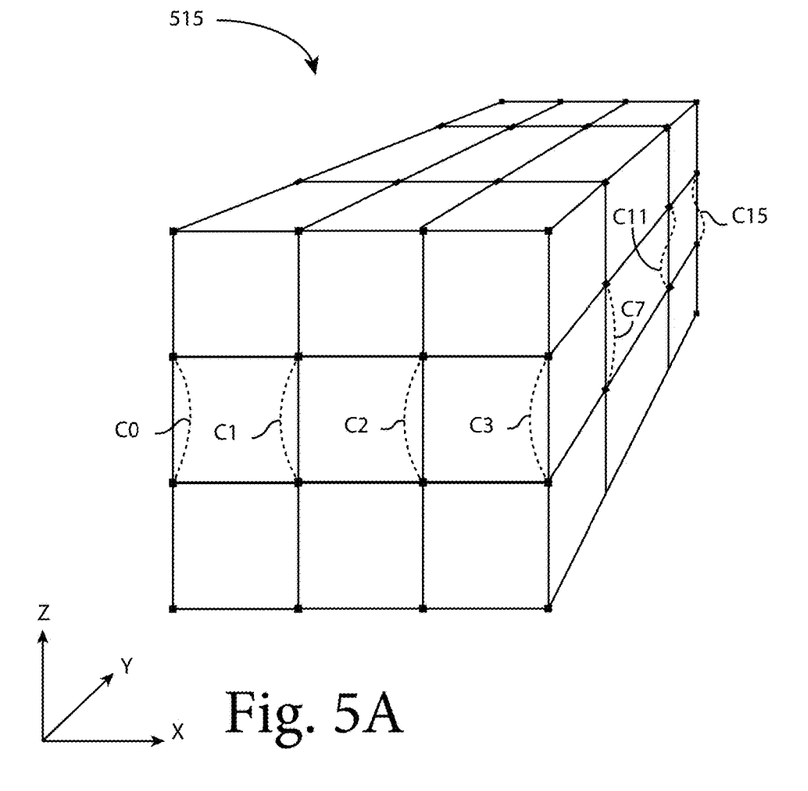
FIG. 5A is a perspective view of sixty-four points used in interpolation.
Figure 5B:
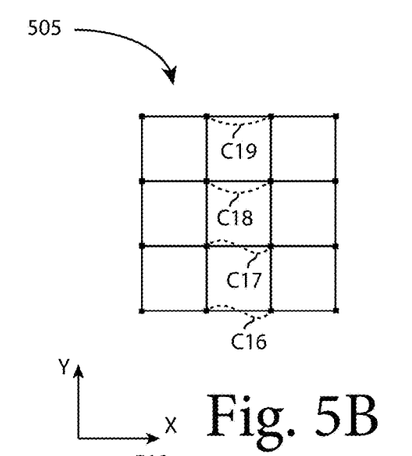
FIG. 5B is a view of sixteen data points resulting from analysis of one axis of the sixty-four points illustrated in FIG. 5A.
Figure 5C:
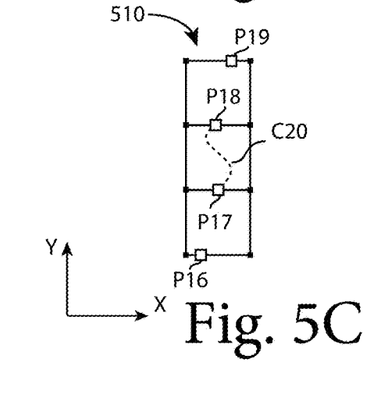
FIG. 5C is a view of four data points resulting from analysis of the sixteen data points illustrated in FIG. 5B.

As shown in FIGS. 5A-5C, a single curve segment, such as curve segment C20, is built for each fragment (i.e. pixel, voxel or physical dot on a graphics display) that is itself a one dimensional (1D) texture (e.g. wiggle display) computation in the 3D texture shader.

For a 2D texture, each fragment requires creation of five curve segments. Forming a 4×4 2D vertex array 505 requires access to sixteen vertices. This is due to the requirement that four curve segments be built in any one of the two dimensions. Then, the four curves are evaluated at the same parameter "t" (on each of the four curves) to form four vertices 510, which can be interpolated to produce a final curve segment C20.

For 3D textures, each fragment (e.g. C20) is built using twenty-one curve segments, built from sixty-four vertices in a 4×4×4 3D vertex array, such as the array 515 illustrated in FIG. 5A. This is due to the requirement to build sixteen curve segments in any single one of the three dimensions, and the need to evaluate these sixteen curve segments at the same parameter "t" (on each of the 16 curves) to form a 4×4 array 505.

Any of the coordinate axes (x, y or z) can be chosen as the first dimension to build the hybrid Bezier curve. The majority of the computational load is associated with analysis of the first dimension. Sixteen of the twenty-one computations are performed in the first dimension.

After performing computations in the first dimension, the procedure is the same as 2D texture procedure detailed above. That is, four curve segments (C16, C17, C18, and C19) are built in the second dimension, as illustrated in FIG. 5B, and the same value is evaluated on these four curves to form the four vertices shown in FIG. 5C. The final curve segment C20 is built from these four vertices, as illustrated in FIG. 5C. These four vertices are evaluated to get final fragment value. Thus, sixty-four vertices are used to build twenty-one curve segments in order to compute one 3D fragment.

It is challenging to use hybrid curve computations in the second and third dimensions, because the curve does not pass through any data points, thus it cannot be predefined. Input data points for the second dimension are the dynamic output from computation of the first dimension (detailed above). Thus, the first dimension curves can be pre-defined based on fixed 3D data points, which takes minimal time to build as compared to the total computation. This method can reduce the computation load significantly.

For each fragment, the 3D texture shader needs to create (16+4+1)=21 curve segments, from sixty-four 3D data points (for example, located in a 3D texture buffer).

If a curve segment is represented by a cubic Bezier curve, it needs six weighted average computations to evaluate a point on the curve. If the curve segment is a quadratic Bezier curve, it will need three weighted average computations. If the curve segment is a linear Bezier curve, it will need one weighted average computation. The technique described herein uses lower degree curves whenever possible and higher degree curves when necessary.

In most texturing applications, the tri-dimensional shader interpolations are either linear (often using the texture defaults in the graphics card), or cubic. Quadratic interpolation is rarely used, because in general, it cannot handle inflection points in one curve segment, thus not guaranteeing C1 continuity of the combined curve and therefore, rarely used. C1 is defined herein as the first derivative at the junction of consecutive curve segments; both segments' first derivatives are required to be equal.

The technique described herein uses hybrid degree curve segments during curve construction. That is, some curve segments will be created using linear interpolation, some will be created using quadratic interpolation, and some will be created using cubic interpolation. Using non-cubic (i.e., linear or quadratic) interpolation for at least some of the curve segments significantly reduces the computation load with a reduction in continuity reflected only in the difference between C1 continuity (defined above) and G1 continuity. G1 continuity between two curves requires that they meet at a junction point and that their tangents at the junction point be the same. The difference between C1 and G1 is that in G1 the derivative magnitude can be different. The human eye can hardly tell the difference between C1 and G1 continuity.

The major reason to use cubic interpolation, instead of quadratic interpolation, is that cubic interpolation can handle inflection points while quadratic interpolation cannot. The method described herein uses quadratic wherever there is no inflection point. The method also uses linear where the data values are almost homogeneous.

Figure 6:
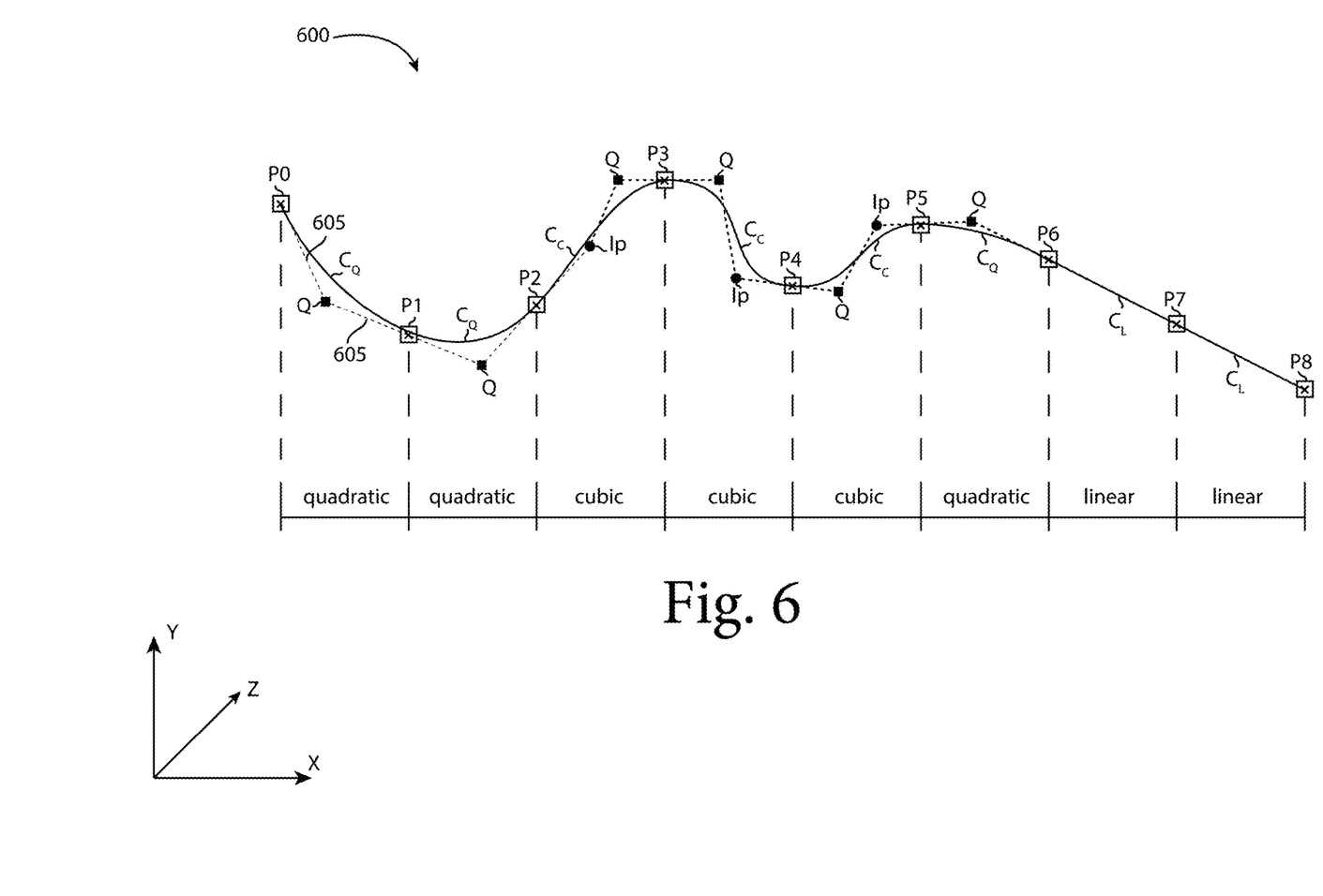
FIG. 6 is an illustration of a hybrid Bezier spline with G1 continuity at each data point.

A hybrid Bezier spline curve 600, as illustrated in FIG. 6, is built from curve segments including cubic curve segments (labeled $C_C$), quadratic curve segments (labeled $C_Q$), and linear curve segments (labeled $C_L$). The dashed line along the hybrid Bezier curve 600 (which is the solid curved line) represents the individual extended tangent vectors 605 (only two are labeled) used to construct the hybrid Bezier spline curve 600. The point of intersection (Q) that connects two extended tangent vectors 605 is used to determine the degree of the curve segment (described in detail below). As described above, a quadratic curve segment $C_Q$ cannot handle inflection points (Ip). Three extended tangent vectors 605 (between data points P2 and P3, P3 and P4, and P4 and P5) are analyzed using cubic interpolation to construct a cubic curve segment $C_C$ along the inflection point (Ip).

Figure 7A:
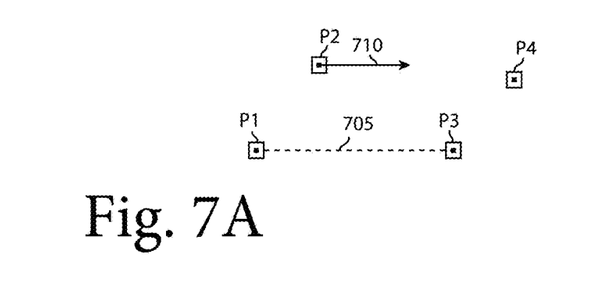
FIG. 7A is a view of a set of data points to be used in interpolation.

In operation, a plurality of a data points are received from a source (not shown). The data points may be seismic data, MM data, or any other similar data. The data points may be uniformly distributed or non-uniformly distributed. As illustrated in FIG. 7A, four consecutive data points (P1, P2, P3, and P4) are selected from the plurality of data points. The data points P1, P2, P3, and P4 are consecutive in that an x-axis 700 coordinate of P1 is less than the x-axis 700 coordinate of P2. Note that the coordinate system labeled AB applies to FIGS. 7A and 7B, and the coordinate system labeled CDEF (which is rotated relative to coordinate system AB to be the same angle that a line through data points P2 and P3 is rotated from FIGS. 7A and 7B to FIGS. 7C, 7D, 7E and 7F) applies to FIGS. 7C, 7D, 7E and 7F. The x-axis 700 coordinate of P2 is greater than the x-axis 700 coordinate of P1, but less than the x-axis 700 coordinate of P3. The x-axis 700 coordinate of P3 is greater than the x-axis 700 coordinate of P2, and less than the x-axis 700 coordinate of P4. The x-axis 700 coordinate of P4 is greater than the x-axis 700 coordinate of P3.

A first line 705 is created through data points P1 and P3. A first tangent vector 710 is created through P2. The first tangent vector 710 originates at P2. The first tangent vector 710 is parallel to the first line 705. The first tangent vector 710 has a direction such that the projection of the first tangent vector 710 onto the x-axis 700 in coordinate system AB is in the direction of the projection of P3 onto the x-axis 700 in coordinate system AB. The first tangent vector 710 may have a unit magnitude. For parts of the analysis, the first tangent vector 710 has an infinite magnitude, in which case it is referred as the "extended first tangent vector."

A second line 720 is created through the data points P2 and P4. A second tangent vector 725 is created through P3. The second tangent vector 725 originates at P3. The second tangent vector 725 is parallel to the second line 720. The second tangent vector 725 has a direction such that the projection of the second tangent vector 725 onto the x-axis 700 in coordinate system AB is in the direction of a projection of P2 onto the x-axis 700 in coordinate system AB. For parts of the analysis, the second tangent vector 725 has an infinite magnitude, in which case it is referred as the "extended second tangent vector."

Figure 7B:
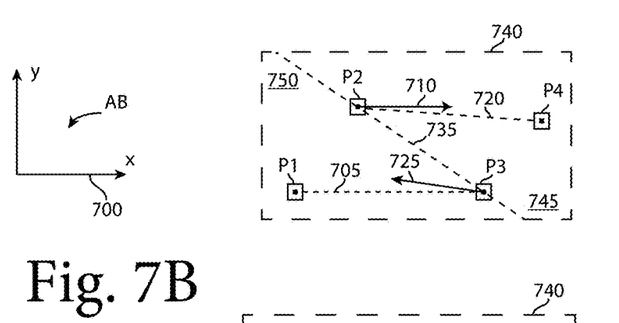
FIG. 7B is an illustration of the building of a Bezier curve.

A baseline 735 is created through P2 and P3. The Bezier curve is created, where the degree of the Bezier curve is based on a comparison of the first tangent vector 710, the second tangent vector 725, and the baseline 735.

The degree of the Bezier curve is determined by defining a plane (represented by dashed box 740). The plane 740 contains the first tangent vector 710 and the second tangent vector 725. The baseline 735 divides the plane 740 into a first half plane 745 and a second half plane 750.

Figure 7C:
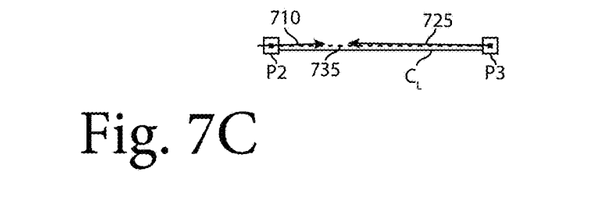
FIG. 7C is an illustration of the building of a linear Bezier curve.

A linear curve segment $C_L$ (where the degree of the Bezier curve is one) is built, as illustrated in FIG. 7C, when the extended first tangent vector 710 is substantially parallel to the baseline 735, and the extended second tangent vector 725 is substantially parallel to the baseline 735. "Substantially parallel" is defined herein to mean parallel within one degree in one embodiment, within five degrees in another embodiment, and within ten degrees in another embodiment.

Figures 7D, 7F:
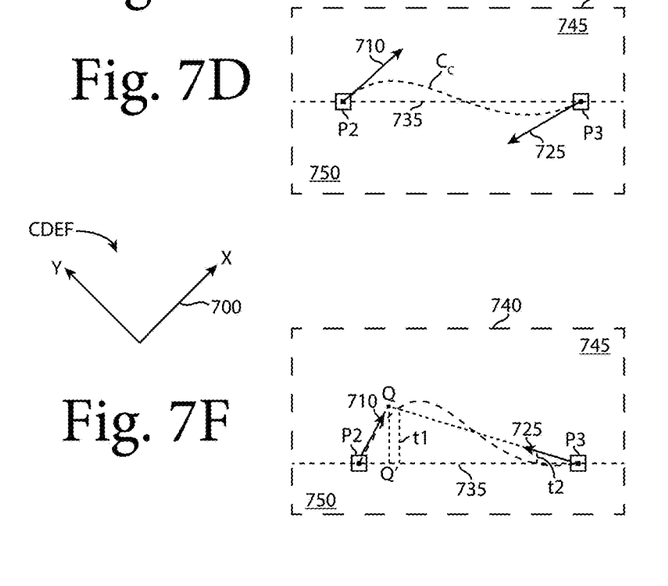
FIG. 7D is an illustration of the building of a cubic Bezier curve.
FIG. 7F is an illustration of the building of a cubic Bezier curve.

A cubic curve segment $C_C$ (where the degree of the Bezier curve is three) is built, as illustrated in FIG. 7D, when the extended first tangent vector 710 and extended second tangent vector 725 are on different half planes.

Figure 7E:
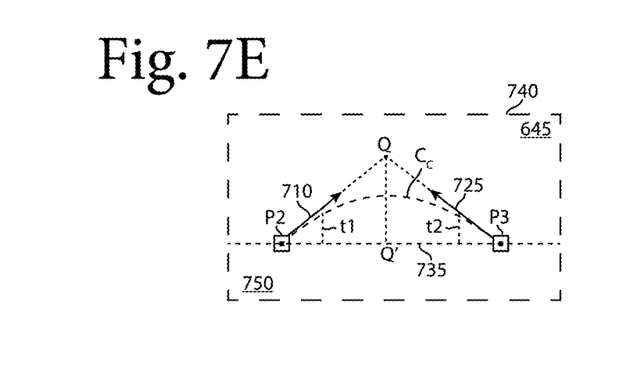
FIG. 7E is an illustration of the building of a quadratic Bezier curve.

When the extended first tangent vector 710 and the extended second tangent vector 725 are on the same side of the baseline 735, the determination of whether to build a cubic curve segment or a quadratic curve segment requires further analysis. A point of intersection (Q), illustrated in FIGS. 7E and 7F, of the extended first tangent vector 710 and the extended second tangent vector 725 is defined. The intersection (Q) is projected onto the baseline 735 as point Q'. A distance is defined between P2 and P3 as "len." A distance between P2 and Q' is defined as "d." A quadratic curve is built, as illustrated in FIG. 7E, when:

$$(t1*len <= d <= t2*len),\quad(4)$$

where, $$t1=1-t2=0.1,$$

A cubic curve is built, as illustrated in FIG. 7F, when:

$$(d<t1*len \text{ OR } d>t2*len),\quad(5)$$

where, $$t1=1-t2=0.1.$$

A curve inflection point can be modeled by cubic curve construction, and not with a lower degree curve.

Figure 8:
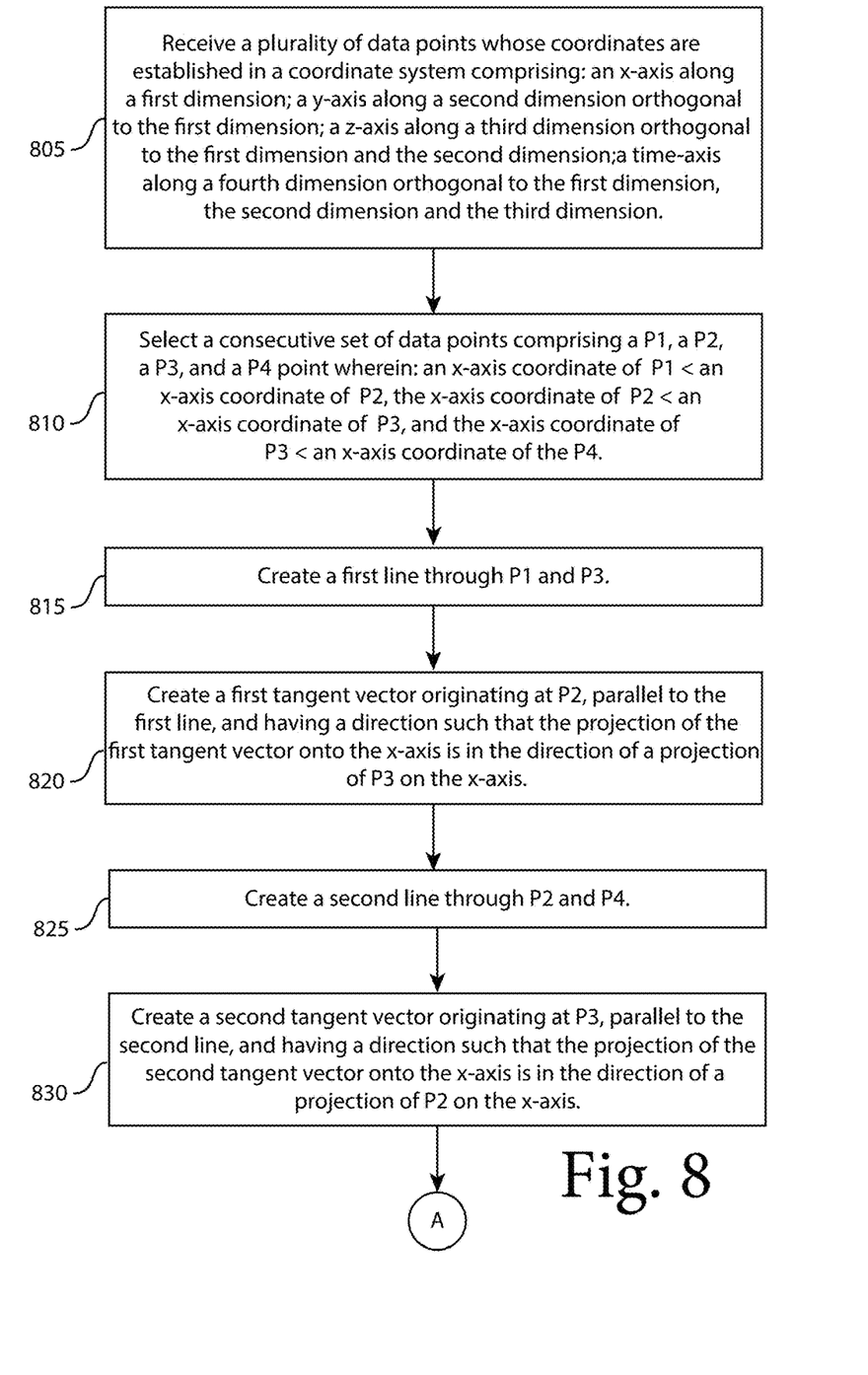
FIG. 8 is a portion of a flow chart for building the hybrid Bezier curve.
Figure 9:
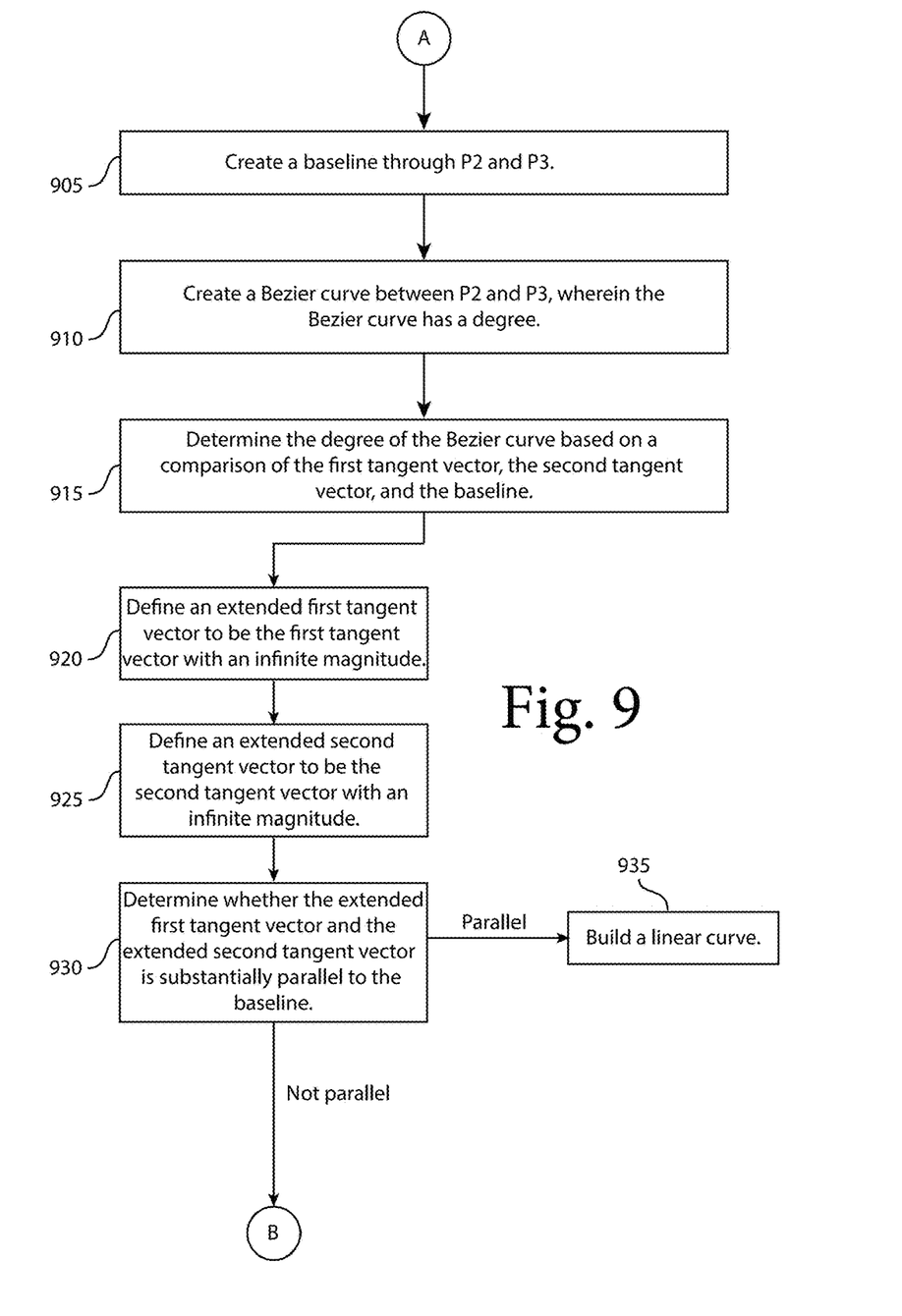
FIG. 9 is a portion of a flow chart for building the hybrid Bezier curve.

In use, as illustrated in FIG. 8, a plurality of data points (such as data points P1, P2, P3 and P4) is received whose coordinates are established in a coordinate system comprising an x-axis (such as x-axis 700) along a first dimension; a y-axis along a second dimension orthogonal to the first dimension; a z-axis along a third dimension orthogonal to the first dimension and the second dimension; a time-axis along a fourth dimension orthogonal to the first dimension, the second dimension and the third dimension (block 805). A consecutive set of data points (such as data points P1, P2, P3 and P4) is selected, wherein an x-axis (such as x-axis 700) coordinate of P1<an x-axis (such as x-axis 700) coordinate of P2, the x-axis (such as x-axis 700) coordinate of P2<an x-axis (such as x-axis 700) coordinate of P3, and the x-axis (such as x-axis 700) coordinate of P3<an x-axis (such as x-axis 700) coordinate of P4 (block 810). A first line (such as first line 705) through P1 and P3 is created (block 815). A first tangent vector (such as first tangent vector 710), originating at P2, parallel to the first line (such as first line 705), and having a direction such that the projection of the first tangent vector (such as first tangent vector 710) onto the x-axis (such as x-axis 700) is in the direction of a projection of P3 onto the x-axis (such as x-axis 700) is created (block 820). A second line (such as second line 720) through P2 and P4 is created (block 825). A second tangent vector (such as second tangent vector 725) through P3 parallel to the second line (such as second line 720), originating at P3, parallel to the second line (such as second line 720), and having a direction such that the projection of the second tangent vector (such as second tangent vector 725) onto the x-axis (such as x-axis 700) is in the direction of a projection of P2 onto the x-axis (such as x-axis 700) is created (block 830). A baseline (such as baseline 735) through P2 and P3 (block 905) is created, as illustrated in FIG. 9. A Bezier curve between P2 and P3 is created, wherein the Bezier curve has a degree (block 910). A degree of the Bezier curve is determined based on a comparison of the first tangent vector (such as first tangent vector 710), the second tangent vector (such as second tangent vector 725), and the baseline (such as baseline 735) (block 915).

Determining the degree of the Bezier curve includes defining an extended first tangent vector (such as extended first tangent vector 710) to be the first tangent vector (such as first tangent vector 710) with an infinite magnitude (block 920). An extended second tangent vector (such as extended second tangent vector 725) is defined to be the second tangent vector (such as second tangent vector 725) with an infinite magnitude (block 925). If both the extended first tangent vector (such as extended first tangent vector 710) and the extended second tangent vector (such as extended second tangent vector 725) are determined not to be substantially parallel to the baseline (such as baseline 735) (block 930) analysis proceeds to FIG. 10 as indicated by bubble "B". Otherwise, a linear curve is built (block 935).

Figure 10:
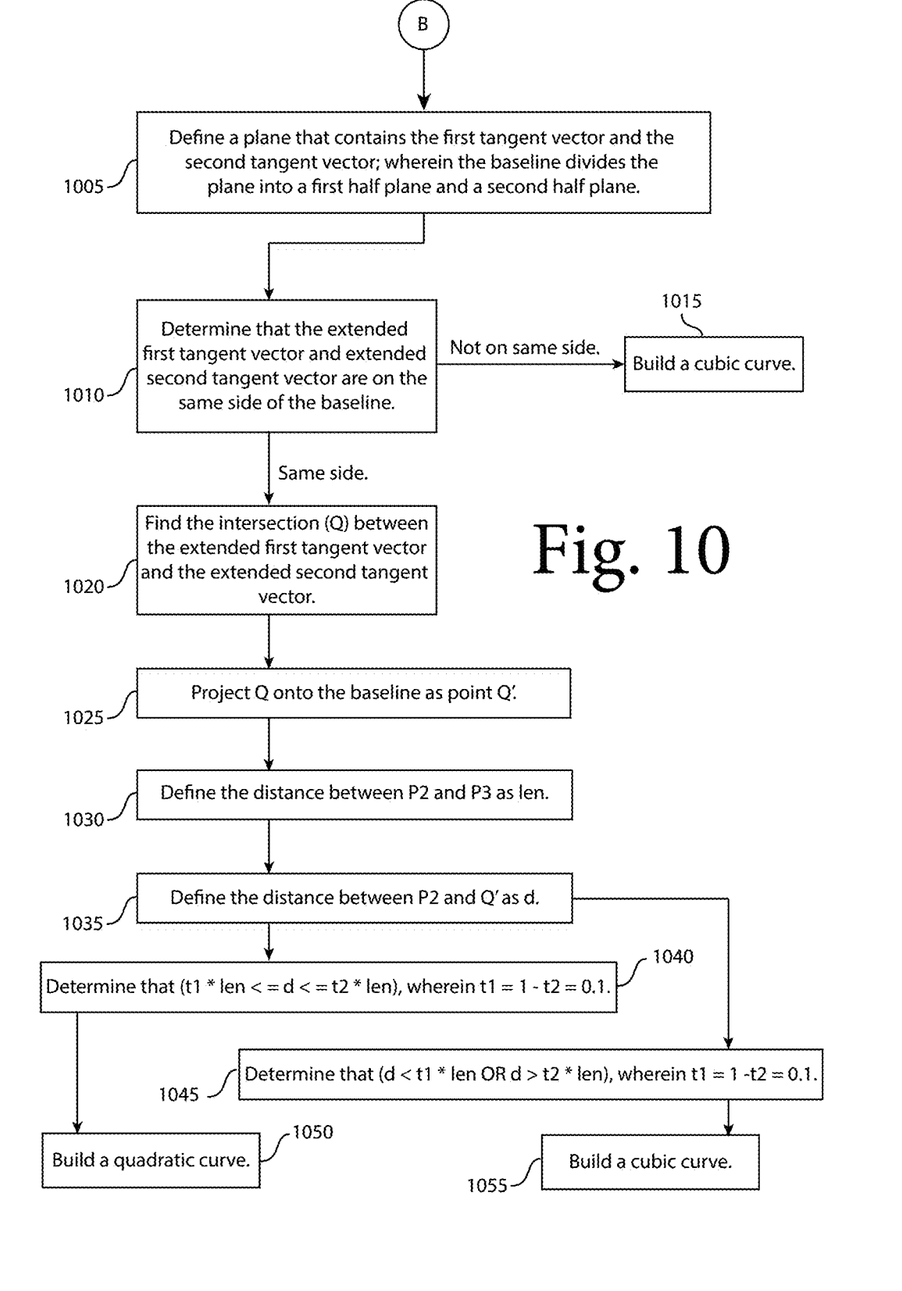
FIG. 10 is a portion of a flow chart for building the hybrid Bezier curve.

Turning to FIG. 10, analysis continues to determine whether a quadratic curve or a cubic curve should be built. A plane (such as plane 740) is defined that contains the first tangent vector (such as first tangent vector 710) and the second tangent vector (such as second tangent vector 725) (block 1005). The baseline (such as baseline 735) divides the plane (such as plane 740) into a first half plane (such as first half plane 745) and a second half plane (such as second half plane 750) (block 1005). If it is determined that the extended first tangent vector (such as extended first tangent vector 710) and extended second tangent vector (such as extended second tangent vector 725) are not on the same side of the baseline (such as baseline 735) (block 1010), a cubic curve is built (block 1015). If it is determined that the extended first tangent vector (such as extended first tangent vector 710) and extended second tangent vector (such as extended second tangent vector 725) are on the same side of the baseline (such as baseline 735) (block 1010) analysis proceeds to block 1020.

The intersection (Q) between the extended first tangent vector (such as extended first tangent vector 710) and the extended second tangent vector (such as extended second tangent vector 725) is defined (block 1020). Intersection (Q) is projected onto the baseline (such as baseline 735) as point Q' (block 1025). The distance between P2 and P3 is defined as "len" (block 1030). The distance between P2 and Q' is defined as "d" (block 1035).

If it is determined that (t1\*len<=d<=t2\*len), as shown in FIG. 7E (block 1040), a quadratic curve $C_Q$ is built (block 1050). If it is determined that (d<t1\*len OR d>t2\*len), as shown in FIG. 7F (block 1045), a cubic curve $C_C$ is built (bock 1055). In one or more embodiments, t1=1−t2=0.1. In one or more embodiments, t1 and t2 have other values.

In one aspect, a method features receiving a plurality of data points whose coordinates are established in a coordinate system. The coordinate system includes an x-axis along a first dimension. The coordinate system includes a y-axis along a second dimension orthogonal to the first dimension. The coordinate system includes a z-axis along a third dimension orthogonal to the first dimension and the second dimension. The coordinate system includes a time-axis along a fourth dimension orthogonal to the first dimension, the second dimension and the third dimension. The method includes selecting a consecutive set of data points including P1, P2, P3, and P4. An x-axis coordinate of P1<an x-axis coordinate of P2. The x-axis coordinate of P2<an x-axis coordinate of P3. The x-axis coordinate of P3<an x-axis coordinate of P4. The method includes creating a first line through P1 and P3. The method includes creating a first tangent vector originating at P2, parallel to the first line, and having a direction such that the projection of the first tangent vector onto the x-axis is in the direction of a projection of P3 onto the x-axis. The method includes creating a second line through P2 and P4. The method includes creating a second tangent vector through P3, wherein the second tangent vector is parallel to the second line, originates at P3, is parallel to the second line, and has a direction such that the projection of the second tangent vector onto the x-axis is in the direction of a projection of P2 onto the x-axis. The method includes creating a baseline through P2 and P3. The method includes creating a Bezier curve between P2 and P3, wherein the Bezier curve has a degree. The method includes determining the degree of the Bezier curve based on a comparison of the first tangent vector, the second tangent vector, and the baseline.

Implementations may include one or more of the following. Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include determining that the extended first tangent vector is not substantially parallel to the extended second tangent vector. Determining the degree of the Bezier curve may include defining a plane that contains the first tangent vector and the second tangent vector. The baseline may divided the plane into a first half plane and a second half plane. Determining the degree of the Bezier curve may include determining that the extended first tangent vector and extended second tangent vector are on the same side of the baseline. Determining the degree of the Bezier curve may include finding the intersection (Q) between the extended first tangent vector and the extended second tangent vector. Determining the degree of the Bezier curve may include projecting Q onto the baseline as point Q'. Determining the degree of the Bezier curve may include defining the distance between P2 and P3 as len. Determining the degree of the Bezier curve may include defining the distance between P2 and Q' as d. Determining the degree of the Bezier curve may include determining that (t1\*len<=d<=t2\*len), and, in response, setting the degree of the Bezier curve to quadratic. Determining the degree of the Bezier curve may include t1=1−t2=0.1.

Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include determining that the extended first tangent vector is not substantially parallel to the extended second tangent vector. Determining the degree of the Bezier curve may include defining a plane that contains the first tangent vector and the second tangent vector. The baseline may divide the plane into a first half plane and a second half plane. Determining the degree of the Bezier curve may include determining that the extended first tangent vector and extended second tangent vector are on the same side of the baseline. Determining the degree of the Bezier curve may include finding the intersection (Q) between the extended first tangent vector and the extended second tangent vector. Determining the degree of the Bezier curve may include projecting Q onto the baseline as point Q'. Determining the degree of the Bezier curve may include defining the distance between P2 and P3 as len. Determining the degree of the Bezier curve may include defining the distance between P2 and Q' as d. Determining the degree of the Bezier curve may include determining that (d<t1\*len OR d>t2\*len), and, in response, setting the degree of the Bezier curve to cubic. Determining the degree of the Bezier curve may include t1=1−t2=0.1.

Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include defining a plane that contains the first tangent vector and the second tangent vector. The baseline may divide the plane into a first half plane and a second half plane. Determining the degree of the Bezier curve may include determining that the extended first tangent vector and extended tangent vector are in different half planes, and, in response, setting the degree of the Bezier curve to cubic.

Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include defining a plane that contains the first tangent vector and the second tangent vector. The baseline may divide the plane into a first half plane and a second half plane. Determining the degree of the Bezier curve may include determining that both extended first tangent vector and extended second tangent vector are substantially parallel to the baseline, and, in response, setting the degree of the Bezier curve to linear.

The method may include selecting a consecutive set of non-uniformly distributed data points. The method may include selecting a consecutive set of uniformly distributed data points. The method may include an interpolation selected from a group consisting of linear, quadratic and cubic interpolations in the y-axis. The method may include an interpolation selected from a group consisting of linear, quadratic and cubic interpolations in the z-axis. The method may include an interpolation selected from a group consisting of linear, quadratic and cubic interpolations in the time-axis.

In one aspect, a non-transitory computer-readable medium, on which is recorded a computer program that, when executed, performs a method. The method includes receiving a plurality of data points whose coordinates are established in a coordinate system comprising. The coordinate system includes an x-axis along a first dimension. The coordinate system includes a y-axis along a second dimension orthogonal to the first dimension. The coordinate system includes a z-axis along a third dimension orthogonal to the first dimension and the second dimension. The coordinate system includes a time-axis along a fourth dimension orthogonal to the first dimension, the second dimension and the third dimension. The method includes selecting a consecutive set of data points including a P1, a P2, a P3, and a P4. An x-axis coordinate of P1<an x-axis coordinate of P2. The x-axis coordinate of P2<an x-axis coordinate of P3. The x-axis coordinate of P3<an x-axis coordinate of P4. The method includes creating a first line through P1 and P3. The method includes creating a first tangent vector originating at P2, parallel to the first line, and having a direction such that the projection of the first tangent vector onto the x-axis is in the direction of a projection of P3 on the x-axis. The method includes creating a second line through P2 and P4. The method includes creating a second tangent vector through P3 parallel to the second line originating at P3, parallel to the second line, and having a direction such that the projection of the second tangent vector onto the x-axis is in the direction of a projection of the P2 on the x-axis. The method includes creating a baseline through P2 and P3. The method includes creating a Bezier curve between P2 and P3, wherein the Bezier curve has a degree. The method includes determining the degree of the Bezier curve based on a comparison of the first tangent vector, the second tangent vector, and the baseline.

Implementations may include one or more of the following. Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include determining that the extended first tangent vector is not substantially parallel to the extended second tangent vector. Determining the degree of the Bezier curve may include defining a plane that contains the first tangent vector and the second tangent vector. The baseline may divide the plane into a first half plane and a second half plane. Determining the degree of the Bezier curve may include determining that the extended first tangent vector and extended second tangent vector are on the same side of the baseline. Determining the degree of the Bezier curve may include finding the intersection (Q) between the extended first tangent vector and the extended second tangent vector. Determining the degree of the Bezier curve may include projecting Q onto the baseline as point Q'. Determining the degree of the Bezier curve may include defining the distance between P2 and P3 as len. Determining the degree of the Bezier curve may include defining the distance between P2 and Q' as d. Determining the degree of the Bezier curve may include determining that (t1*len<=d<=t2*len), and, in response, setting the degree of the Bezier curve to quadratic. Determining the degree of the Bezier curve may include t1=1−t2=0.1.

Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include determining that the extended first tangent vector is not substantially parallel to the extended second tangent vector. Determining the degree of the Bezier curve may include defining a plane that contains the first tangent vector and the second tangent vector. The baseline may divide the plane into a first half plane and a second half plane. Determining the degree of the Bezier curve may include determining that the extended first tangent vector and extended second tangent vector are on the same side of the baseline. Determining the degree of the Bezier curve may include finding the intersection (Q) between the extended first tangent vector and the extended second tangent vector. Determining the degree of the Bezier curve may include projecting Q onto the baseline as point Q'. Determining the degree of the Bezier curve may include defining the distance between P2 and P3 as len. Determining the degree of the Bezier curve may include defining the distance between P2 and Q' as d. Determining the degree of the Bezier curve may include determining that (d<t1*len OR d>t2*len), and, in response, setting the degree of the Bezier curve to cubic. Determining the degree of the Bezier curve may include t1=1−t2=0.1.

Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include defining a plane that contains the first tangent vector and the second tangent vector. The baseline may divide the plane into a first half plane and a second half plane. Determining the degree of the Bezier curve may include determining that the extended first tangent vector and extended tangent vector are in different half planes, and, in response, setting the degree of the Bezier curve to cubic.

Determining the degree of the Bezier curve may include defining an extended first tangent vector to be the first tangent vector with an infinite magnitude. Determining the degree of the Bezier curve may include defining an extended second tangent vector to be the second tangent vector with an infinite magnitude. Determining the degree of the Bezier curve may include defining a plane that contains the first tangent vector and the second tangent vector. The baseline may divide the plane into a first half plane and a second half plane. Determining the degree of the Bezier curve may include determining that both extended first tangent vector and extended second tangent vector are substantially parallel to the baseline, and, in response, setting the degree of the Bezier curve to linear.

The method may include selecting a consecutive set of non-uniformly distributed data points. The method may include selecting a consecutive set of uniformly distributed data points. The method may include an interpolation selected from a group consisting of linear, quadratic and cubic interpolations in the y-axis. The method may include an interpolation selected from a group consisting of linear, quadratic and cubic interpolations in the z-axis. The method may include an interpolation selected from a group consisting of linear, quadratic and cubic interpolations in the time-axis.

References in the specification to "one or more embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for reduction of processing artifacts during three-dimensional image rendering, the method comprising:
    collecting signals after they pass through a physical object;
    generating raw volumetric data (RVD) from the collected signals, wherein the RVD is representative of the physical object;
    wherein the RVD includes a plurality of data points whose coordinates are established in a coordinate system comprising:
        an x-axis along a first dimension;
        a y-axis along a second dimension orthogonal to the first dimension;
        a z-axis along a third dimension orthogonal to the first dimension and the second dimension;
    selecting a consecutive set of data points comprising P1, P2, P3, and P4 wherein:
        an x-axis coordinate of P1<an x-axis coordinate of P2, the x-axis coordinate of P2<an x-axis coordinate of P3, and
        the x-axis coordinate of P3<an x-axis coordinate of P4;
    creating a first line through P1 and P3;
    creating a first tangent vector originating at P2, parallel to the first line, and having a direction such that the projection of the first tangent vector onto the x-axis is in the direction of a projection of P3 onto the x-axis;
    creating a second line through P2 and P4;
    creating a second tangent vector through P3, wherein the second tangent vector is parallel to the second line, originates at P3, and has a direction such that the projection of the second tangent vector onto the x-axis is in the direction of a projection of P2 onto the x-axis;
    creating a baseline through P2 and P3;
    creating a Bezier curve between P2 and P3, wherein the Bezier curve has a degree; and
    determining the degree of the Bezier curve based on a comparison of the first tangent vector, the second tangent vector, and the baseline; and
    rendering a reduced artifact three-dimensional representation of the physical object using the Bezier curve.

2. The method of claim 1 wherein determining the degree of the Bezier curve comprises:
    defining an extended first tangent vector to be the first tangent vector with an infinite magnitude;
    defining an extended second tangent vector to be the second tangent vector with an infinite magnitude;
    determining that the extended first tangent vector is not substantially parallel to the extended second tangent vector;
    defining a plane that contains the first tangent vector and the second tangent vector; wherein the baseline divides the plane into a first half plane and a second half plane;
    determining that the extended first tangent vector and extended second tangent vector are on the same side of the baseline;
    finding the intersection (Q) between the extended first tangent vector and the extended second tangent vector;
    projecting Q onto the baseline as point Q';
    defining the distance between P2 and P3 as len;
    defining the distance between P2 and Q' as d;
    determining that (t1*len<=d<=t2*len), and, in response, setting the degree of the Bezier curve to quadratic.

3. The method of claim 2 wherein t1=1-t2=0.1.

4. The method of claim 1 wherein determining the degree of the Bezier curve comprises:
    defining an extended first tangent vector to be the first tangent vector with an infinite magnitude;
    defining an extended second tangent vector to be the second tangent vector with an infinite magnitude;
    determining that the extended first tangent vector is not substantially parallel to the extended second tangent vector;
    defining a plane that contains the first tangent vector and the second tangent vector; wherein the baseline divides the plane into a first half plane and a second half plane;
    determining that the extended first tangent vector and extended second tangent vector are on the same side of the baseline;
    finding the intersection (Q) between the extended first tangent vector and the extended second tangent vector;
    projecting Q onto the baseline as point Q';
    defining the distance between P2 and P3 as len;
    defining the distance between P2 and Q' as d;
    determining that (d<t1*len OR d>t2*len), and, in response, setting the degree of the Bezier curve to cubic.

5. The method of claim 4 wherein t1=1-t2=0.1.

6. The method of claim 1 wherein determining the degree of the Bezier curve comprises:
    defining an extended first tangent vector to be the first tangent vector with an infinite magnitude;
    defining an extended second tangent vector to be the second tangent vector with an infinite magnitude;

defining a plane that contains the first tangent vector and the second tangent vector; wherein the baseline divides the plane into a first half plane and a second half plane;

determining that the extended first tangent vector and extended tangent vector are in different half planes, and, in response, setting the degree of the Bezier curve to cubic.

7. The method of claim 1 wherein determining the degree of the Bezier curve comprises:

defining an extended first tangent vector to be the first tangent vector with an infinite magnitude;

defining an extended second tangent vector to be the second tangent vector with an infinite magnitude;

defining a plane that contains the first tangent vector and the second tangent vector; wherein the baseline divides the plane into a first half plane and a second half plane;

determining that both extended first tangent vector and extended second tangent vector are substantially parallel to the baseline, and, in response, setting the degree of the Bezier curve to linear.

8. The method of claim 1 further comprises selecting a consecutive set of non-uniformly distributed data points.

9. The method of claim 1 further comprises selecting a consecutive set of uniformly distributed data points.

10. A non-transitory computer-readable medium, on which is recorded a computer program that, when executed, performs a method for reduction of processing artifacts during three-dimensional image rendering, the method comprising:

collecting signals after they pass through a physical object;

generating raw volumetric data (RVD) from the collected signals, wherein the RVD is representative of the physical object;

wherein the RVD includes a plurality of data points whose coordinates are established in a coordinate system comprising:

an x-axis along a first dimension;

a y-axis along a second dimension orthogonal to the first dimension;

a z-axis along a third dimension orthogonal to the first dimension and the second dimension;

selecting a consecutive set of data points comprising a P1, a P2, a P3, and a P4 point wherein:

an x-axis coordinate of P1<an x-axis coordinate of P2, the x-axis coordinate of P2<an x-axis coordinate of P3, and the x-axis coordinate of P3<an x-axis coordinate of P4;

creating a first line through P1 and P3;

creating a first tangent vector originating at P2, parallel to the first line, and having a direction such that the projection of the first tangent vector onto the x-axis is in the direction of a projection of P3 on the x-axis;

creating a second line through P2 and P4;

creating a second tangent vector through P3 parallel to the second line originating at P3, and having a direction such that the projection of the second tangent vector onto the x-axis is in the direction of a projection of P2 on the x-axis;

creating a baseline through P2 and P3;

creating a Bezier curve between P2 and P3, wherein the Bezier curve has a degree; and determining the degree of the Bezier curve based on a comparison of the first tangent vector, the second tangent vector, and the baseline; and rendering a reduced artifact three-dimensional representation of the physical object using the Bezier curve.

11. The non-transitory computer-readable medium of claim 10 wherein determining the degree of the Bezier curve comprises:

defining an extended first tangent vector to be the first tangent vector with an infinite magnitude;

defining an extended second tangent vector to be the second tangent vector with an infinite magnitude;

determining that the extended first tangent vector is not substantially parallel to the extended second tangent vector;

defining a plane that contains the first tangent vector and the second tangent vector; wherein the baseline divides the plane into a first half plane and a second half plane;

determining that the extended first tangent vector and extended second tangent vector are on the same side of the baseline;

finding the intersection (Q) between the extended first tangent vector and the extended second tangent vector;

projecting Q onto the baseline as point Q';

defining the distance between P2 and P3 as len;

defining the distance between P2 and Q' as d;

determining that (t1*len<=d<=t2*len), and, in response, setting the degree of the Bezier curve to quadratic.

12. The non-transitory computer-readable medium of claim 11 wherein $t1=1-t2=0.1$.

13. The non-transitory computer-readable medium of claim 10 wherein determining the degree of the Bezier curve comprises:

defining an extended first tangent vector to be the first tangent vector with an infinite magnitude;

defining an extended second tangent vector to be the second tangent vector with an infinite magnitude;

determining that the extended first tangent vector is not substantially parallel to the extended second tangent vector;

defining a plane that contains the first tangent vector and the second tangent vector;

wherein the baseline divides the plane into a first half plane and a second half plane;

determining that the extended first tangent vector and extended second tangent vector are on the same side of the baseline;

finding the intersection (Q) between the extended first tangent vector and the extended second tangent vector;

projecting Q onto the baseline as point Q';

defining the distance between P2 and P3 as len;

defining the distance between P2 and Q' as d;

determining that (d<t1*len OR d>t2*len), and, in response, setting the degree of the Bezier curve to cubic.

14. The non-transitory computer-readable medium of claim 13 wherein $t1=1-t2=0.1$.

15. The non-transitory computer-readable medium of claim 10 wherein determining the degree of the Bezier curve comprises:

defining an extended first tangent vector to be the first tangent vector with an infinite magnitude;

defining an extended second tangent vector to be the second tangent vector with an infinite magnitude;

defining a plane that contains the first tangent vector and the second tangent vector;

wherein the baseline divides the plane into a first half plane and a second half plane;

determining that the extended first tangent vector and extended tangent vector are in different half planes, and, in response, setting the degree of the Bezier curve to cubic.

16. The non-transitory computer-readable medium of claim 10 wherein determining the degree of the Bezier curve comprises:
   defining an extended first tangent vector to be the first tangent vector with an infinite magnitude;
   defining an extended second tangent vector to be the second tangent vector with an infinite magnitude;
   defining a plane that contains the first tangent vector and the second tangent vector;
      wherein the baseline divides the plane into a first half plane and a second half plane;
   determining that both extended first tangent vector and extended second tangent vector are substantially parallel to the baseline, and, in response, setting the degree of the Bezier curve to linear.

17. The non-transitory computer-readable medium of claim 10 wherein the method further comprises selecting a consecutive set of non-uniformly distributed data points.

18. The non-transitory computer-readable medium of claim 10 wherein the method further comprises selecting a consecutive set of uniformly distributed data points.

* * * * *